US010438065B2

(12) United States Patent
Henderson

(10) Patent No.: US 10,438,065 B2
(45) Date of Patent: *Oct. 8, 2019

(54) INCENTIVIZING FOODSTUFF CONSUMPTION THROUGH THE USE OF AUGMENTED REALITY FEATURES

(71) Applicant: Mnemonic Health, Inc., New York, NY (US)

(72) Inventor: Mark Lindsay Henderson, New York, NY (US)

(73) Assignee: Mnemonic Health, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,994

(22) Filed: Jul. 9, 2018

(65) Prior Publication Data

US 2019/0012545 A1    Jan. 10, 2019

Related U.S. Application Data

(63) Continuation of application No. 15/672,142, filed on Aug. 8, 2017, now Pat. No. 10,019,628, which is a
(Continued)

(51) Int. Cl.
*G06T 19/00* (2011.01)
*G06K 9/00* (2006.01)
(Continued)

(52) U.S. Cl.
CPC ........... *G06K 9/00671* (2013.01); *G06F 3/14* (2013.01); *G06F 3/147* (2013.01);
(Continued)

(58) Field of Classification Search
CPC ........ G06F 3/011; G06F 3/017; G06T 19/006; G06T 19/00; G06T 2207/20221;
(Continued)

(56) References Cited

U.S. PATENT DOCUMENTS 9,754,168 B1    9/2017 Henderson
10,019,628 B1   7/2018 Henderson
(Continued)

OTHER PUBLICATIONS

Ganesh, Sangita, et al., "FoodWorks: tackling fussy eating by digitally augmenting children's meals," Proceedings of the 8th Nordic Conference on Human-Computer Interaction: Fun, Fast, Foundational. ACM, 2014.

*Primary Examiner* — Sultana M Zalalee
(74) *Attorney, Agent, or Firm* — Perkins Coie LLP

(57) ABSTRACT

Introduced here are techniques for incentivizing the consumption of foodstuffs through the use of augmented reality features. A parent may initiate an application on a mobile phone and scan a plate of one or more foodstuffs by initiating a live view captured by a camera. The parent can then select a given foodstuff that a child is unlikely to consume. When the child views the given foodstuff through the mobile phone, a portion of an augmented reality feature could be shown. For example, the child may be able to see the tail of a creature, a corner of a item, etc. As the child consumes the given foodstuff, additional portion(s) of the augmented reality feature are exposed, and the augmented reality feature becomes increasingly visible. Such a technique incentivizes the child to continue eating the given foodstuff so that the augmented reality feature can be fully seen.

20 Claims, 14 Drawing Sheets

Related U.S. Application Data continuation of application No. 15/596,643, filed on May 16, 2017, now Pat. No. 9,754,168.

(51) Int. Cl.

| | |
|---|---|
| *H04N 5/232* | (2006.01) |
| *H04W 4/02* | (2018.01) |
| *G06F 3/14* | (2006.01) |
| *G06K 19/06* | (2006.01) |
| *G06T 11/60* | (2006.01) |
| *G06F 3/147* | (2006.01) |

(52) U.S. Cl.
CPC ... *G06K 9/00765* (2013.01); *G06K 19/06028* (2013.01); *G06K 19/06037* (2013.01); *G06T 11/60* (2013.01); *G06T 19/006* (2013.01); *H04N 5/23293* (2013.01); *H04W 4/02* (2013.01)

(58) Field of Classification Search
CPC ...... G06T 2207/30128; G06K 2209/17; G06K 9/00; G06K 9/00671; G06K 9/00993; G06K 9/78; A23L 33/30; G09G 2370/022; G09G 3/003; H04N 13/02; H04N 13/0253
See application file for complete search history.

(56) References Cited

U.S. PATENT DOCUMENTS

| | | |
|---|---|---|
| 2010/0111383 A1 | 5/2010 | Boushey et al. |
| 2013/0204813 A1 | 8/2013 | Master et al. |
| 2013/0215230 A1 | 8/2013 | Miesnieks et al. |
| 2014/0235324 A1 | 8/2014 | Ryan et al. |
| 2015/0154371 A1 | 6/2015 | Wald et al. |
| 2015/0332620 A1 | 11/2015 | Hayashi et al. |
| 2015/0379770 A1 | 12/2015 | Haley, Jr. et al. |
| 2016/0150213 A1 | 5/2016 | Mutti et al. |
| 2016/0320833 A1 | 11/2016 | Schuman et al. |

800

801 Launch an application on a mobile phone that includes a camera

802 Cause a communication link to be established between the mobile phone and a network-connected server

803 Initiate a live view of foodstuff(s)

804 Identify some or all of the foodstuff(s)

805 Generate an augmented reality feature that is at least partially hidden beneath a particular foodstuff

806 Animate a portion of the augmented reality feature that is exposed from the particular foodstuff

807 Monitor the live view

808 Determine that the particular foodstuff has been partially or entirely consumed

809 Display additional portion(s) of the augmented reality feature based on an amount of the particular foodstuff that has been consumed

810 Generate metadata specifying that the additional portion(s) of the augmented reality feature have been exposed

811 Transmit the metadata to the network-connected server

901  Launch an application on a mobile phone that includes a camera

902  Cause a communication link to be established between the mobile phone and a network-connected server 903  Initiate a live view of foodstuff(s)

904  Automatically identify some or all of the foodstuff(s)

905  Receive user input indicative of a selection of a particular foodstuff

906  Receive user input indicative of a specification of a characteristic of the augmented reality feature 907  Generate an augmented reality feature

FIG. 9

INCENTIVIZING FOODSTUFF CONSUMPTION THROUGH THE USE OF AUGMENTED REALITY FEATURES

CROSS REFERENCE TO RELATED APPLICATION

This patent application is a continuation of U.S. patent application Ser. No. 15/672,142, filed Aug. 8, 2017, which is a continuation of U.S. patent application Ser. No. 15/596,643, filed May 16, 2017, which are incorporated by reference herein in their entirety.

RELATED FIELD

Various embodiments pertain to computer-generated sensory input and, more specifically, to augmented reality features that can be used to incentivize the consumption of foodstuffs.

BACKGROUND

Recent studies on children's eating habits have shown that many American toddlers go without vegetables on any given day. For example, one in four 6-month-olds to 11-month-olds and one in five 1-year-olds reported no vegetable consumption at all on days on which they were surveyed. Studies have also shown a general decline in the consumption of healthy fruits and vegetables among toddlers, and that most children are consuming less than half the recommended amount of fruits and vegetables. Because children's eating patterns develop at a young age, poor eating habits when young can put children on a path of poor nutrition that often extends into adulthood.

However, fruits and vegetables are high in the vitamins, minerals, antioxidants, and dietary fibers necessary to promote good health/development and protect against disease/illness. Fruits and vegetables have been shown to improve overall nutrition, weight management, intestinal health, academic performance, disease prevention, etc. Consequently, the American Academy of Pediatrics (AAP) recommends that vegetables be consumed with every meal and snack. But it can be difficult to get children to consistently consume nutritious foods.

BRIEF DESCRIPTION OF THE DRAWINGS

Embodiments of various systems and techniques for creating augmented reality features (also referred to as "the technology") are illustrated by way of example and not limitation in the accompanying drawings, in which like references indicate similar elements. Various objects, features, and characteristics of the technology will become more apparent to those skilled in the art from a study of the Detailed Description in conjunction with the accompanying drawings.

FIG. 8 depicts a flow diagram of a process for incentivizing the consumption of foodstuff through the use of augmented reality features.

FIG. 9 depicts a flow diagram of a process for creating augmented reality features that can be used to incentivize the consumption of foodstuffs.

Figure 1A:
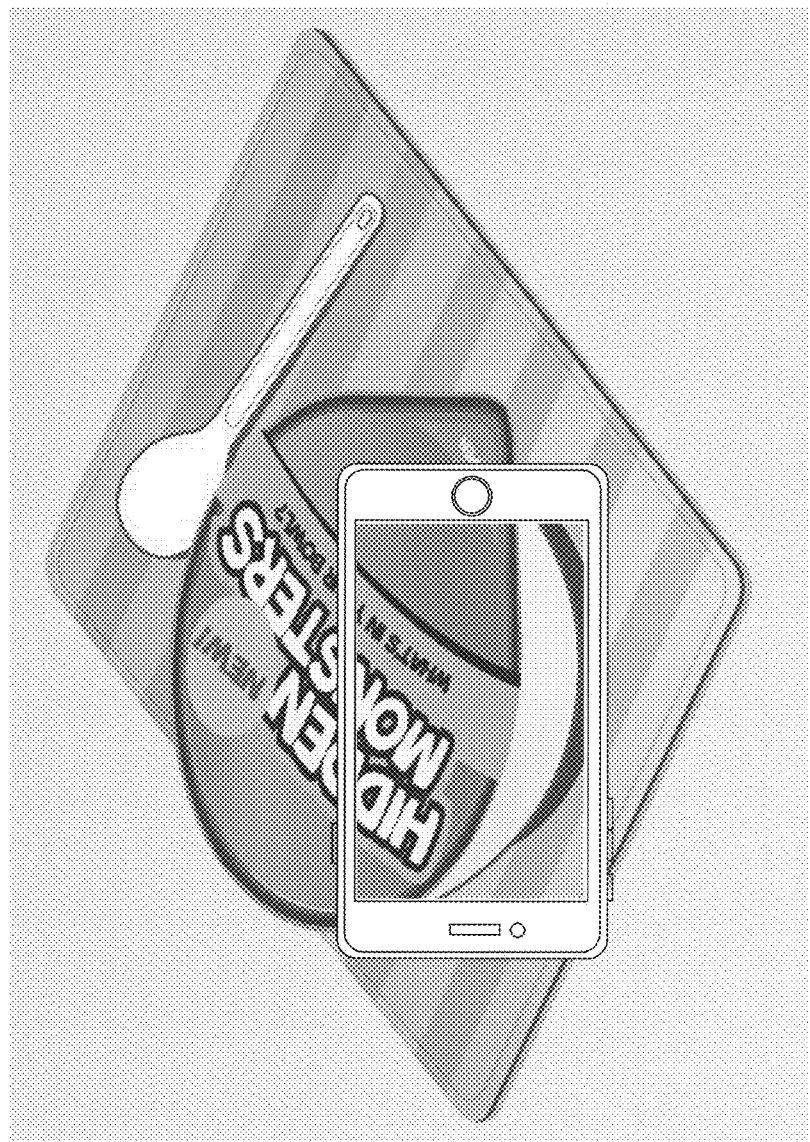
FIG. 1A illustrates how the application may be configured to initiate a live view of a branded foodstuff.

The figures depict various embodiments of the technology for the purpose of illustration only. Those skilled in the art will recognize that alternative embodiments may be employed without departing from the principles of the technology.

DETAILED DESCRIPTION

Introduced here are various systems and techniques for incentivizing the consumption of foodstuffs through the use of augmented reality features. Such technology can be used to address a fundamental challenge, namely, persuading children to eat nutritional foods, such as fruits and vegetables.

For example, a parent may initiate an application on a mobile phone, and then scan a plate of one or more foodstuffs by initiating a live view that is captured by a camera. The term "foodstuffs" is used to generally refer to any type of food or beverage. While the application may be configured to automatically identify recognizable features indicative of a certain foodstuff (e.g., shapes and colors), the parent will typically need to indicate which foodstuff(s) on the plate will be associated with an augmented reality feature.

For example, the parent may select a given foodstuff (e.g., spinach) that a child is least likely to consume from multiple foodstuffs on a plate, cup, or bowl. When the child views the given foodstuff through the mobile phone, a portion of an augmented reality feature could be shown. For example, the child may be able to see the tail of a dragon, a corner of a treasure chest, etc. The portion that is shown can also be referred to as a "hint" or "teaser" of the digitally-animated reward that awaits the child once the child finishes consuming some or all of the given foodstuff.

As the child consumes the given foodstuff, additional portion(s) of the augmented reality feature are exposed, and the augmented reality feature becomes increasingly visible. Such a technique incentivizes the child to continue eating the given foodstuff so that the augmented reality feature can be fully seen. After the child has finished eating the given foodstuff, the parent or the child may once again scan the plate by initiating the live view. The application may detect that some or all of the given foodstuff is no longer present (which is indicative of consumption by the child), and then present a "payoff." In some embodiments the "payoff" is simply presenting the entire augmented reality feature for viewing by the child, while in other embodiments the "payoff" is a digital collectible corresponding to the augmented reality feature.

Some embodiments have been described in the context of parents and children for the purpose of illustration. Note, however, that the technology can be used by individuals of any age. For example, adults may also collect augmented reality features that are associated with television programs, video games, etc. Although certain embodiments may be described in the context of mobile phones, those skilled in the art will recognize that such embodiments have been selected for the purpose of illustration only. The technology could be used in combination with any computing device that is able to present augmented reality content, including personal computers, tablet computers, personal digital assistants (PDAs), game consoles (e.g., Sony PlayStation® or Microsoft Xbox®), music players (e.g., Apple iPod Touch®), wearable electronic devices (e.g., watches or fitness bands), network-connected ("smart") devices (e.g., televisions and home assistant devices), virtual/augmented reality systems (e.g., head-mounted displays such as Oculus Rift® and Microsoft Hololens®), or other electronic devices.

For example, a child could wear a head-mounted display that allows the child to have a live direct/indirect view of a physical, real-world environment whose elements are augmented by computer-generated sensory input (e.g., one or more augmented reality features). The augmented reality feature(s) may be created responsive to instructions generated by the head-mounted display or another computing device to which the head-mounted display is communicatively coupled. For example, an application residing on a mobile phone associated with a parent may generate instructions for creating the augmented reality feature(s) and transmit those instructions to the head-mounted display. As another example, a network-connected server system may generate instructions for creating the augmented reality feature(s) and transmit those instructions to the mobile phone or the head-mounted display.

These computing devices may communicate with one another via a wired communication channel or a wireless communication channel. For example, the computing devices may communicate via a short range wireless technology/protocol, such as Wi-Fi, Bluetooth®, Near Field Communication (NFC), cellular, infrared, radio-frequency identification (RFID), etc.

Oftentimes, the embodiments described herein will be tailored for one or more particular environments. Accordingly, embodiments may be described with reference to certain devices (e.g., mobile phones) or networks (e.g., wireless local area networks (WLANs) configured for use in homes). However, those skilled in the art will recognize that features of the technology are transferable across different devices, environments, network types, network topologies, etc.

Terminology

Brief definitions of terms, abbreviations, and phrases used throughout the specification are given below.

Reference in this specification to "one embodiment" or "an embodiment" means that a particular feature, structure, or characteristic described in connection with the embodiment is included in at least one embodiment of the disclosure. The appearances of the phrase "in some embodiments" are not necessarily referring to the same embodiments, nor are they necessarily referring to separate or alternative embodiments that are mutually exclusive of one another. Moreover, various features are described that may be exhibited by some embodiments but not others. Similarly, various requirements are described that may be requirements for some embodiments but not others.

Unless the context clearly requires otherwise, the words "comprise" and "comprising" are to be construed in an inclusive sense rather than an exclusive or exhaustive sense (i.e., in the sense of "including, but not limited to"). The terms "connected," "coupled," or any variant thereof includes any connection or coupling between two or more elements, either direct or indirect. The coupling or connection between the elements can be physical, logical, or a combination thereof. For example, two devices may be coupled directly to one another or via one or more intermediary channels/devices. Devices may also be coupled in such a way that information can be passed there between, despite not sharing any physical connection with one another. The words "associate with," meanwhile, mean connecting or relating objects, items, etc.

Where the context permits, words used in the singular sense or the plural sense may also be used in the plural sense or the singular sense, respectively. The word "or," in reference to a list of two or more items, covers all of the following interpretations of the word: any of the items in the list, all of the items in the list, and any combination of the items in the list. If the specification states a component or feature "may," "can," "could," or "might" be included or have a characteristic, that particular component or feature is not required to be included or have the characteristic in every embodiment.

The term "module" refers broadly to software, hardware, and/or firmware components. Modules are typically functional components that can generate useful data or other output using specified input(s). A module may or may not be self-contained. A software program or application may include one or more modules.

The terminology used in the Detailed Description is intended to be interpreted in its broadest reasonable manner, even though it is being used in conjunction with certain embodiments. The terms used in this specification generally have their ordinary meanings in the art, in the context of the disclosure as a whole and in the specific context where each term is used. For convenience, certain terms may be highlighted using, for example, capitalization, italics, and/or quotation marks. However, the use of highlighting has no influence on the scope and meaning of a term. The scope and meaning of a term is the same, in the same context, whether or not it is highlighted.

Consequently, although alternative language and synonyms may be used for some terms, special significance is not to be placed upon whether or not a term is elaborated or discussed herein. A recital of one or more synonyms does not exclude the use of other synonyms. The use of examples anywhere in this specification, including examples of any terms discussed herein, is intended to be illustrative only. These examples are not intended to limit the scope and meaning of the disclosure or of any exemplified term. Likewise, the disclosure is not limited to the various embodiments described below.

System Topology Overview

Various systems and techniques for incentivizing the consumption of foodstuffs through the use of augmented reality features. Examples of augmented reality features include digital representations of creatures (e.g., humanoid characters and non-humanoid characters, such as dragons and dinosaurs) and items (e.g., treasure chests, trading cards, jewels, coins). In some embodiments, the digital representations are created using real textures (e.g., two-dimensional (2D) or three-dimensional (3D) footage/photographs) that are mapped onto computer-generated structures. For example, real images (or video footage sequences) of a shark could be mapped onto a 3D animated sequence. In other embodiments, the digital represents are illustrations not based on real photos/video. The term "foodstuffs," meanwhile, is used to generally refer to any type of food or beverage.

Generally, a parent initiates an application on a mobile phone and scans one or more foodstuffs by initiating a live view captured by an optical sensor (e.g., a camera) or capturing a static image using the optical sensor. The parent may initiate the application by selecting a corresponding icon presented by the mobile phone, and then direct a focal point of the optical sensor toward the foodstuff.

Several of the embodiments described herein pertain to instances where the type of augmented reality feature that is shown to a child depends on a matching cup/bowl/plate. Said another way, augmented reality features may uniquely correspond to certain foodstuffs.

FIG. 1A illustrates how the application may be configured to initiate a live view of a branded foodstuff. A "branded foodstuff" is a foodstuff that is associated with a particular brand. In some embodiments, the application parses the live video feed captured by the optical sensor for real-time recognition purposes in order to identify alphanumeric character(s), symbol(s), and/or design(s) that are indicative of a particular brand. Together, these elements define a particular syntax or pattern that corresponds to the particular brand.

Here, for example, the application may identify the type of foodstuff based on the presence of the terms "Hidden Monsters." There may be premium augmented reality features (also referred to as "premium collectibles" or "premium incentives") that require specific branded foodstuffs be purchased from participating partners (e.g., grocery/retail stores or foodstuff manufacturers).

Figure 1B:
FIG. 1B illustrates how the application may be used to scan a branded code affixed to the packaging of a branded foodstuff.

In some embodiments, the specific foodstuffs come with branded codes that can be scanned by the parent using the mobile phone. FIG. 1B illustrates how the application may be used to scan a branded code affixed to the packaging of a branded foodstuff. The branded code could also be affixed to a loose item (e.g., a card or a toy) that is secured within the packaging of the branded foodstuff. For example, a branded code could be affixed to a paper card that is placed with a cereal box. Additionally or alternatively, an individual (e.g., a parent or child) could scan a purchase receipt as alternate proof of foodstuff purchase.

A branded code can be composed of some combination of machine-readable elements, human-readable elements, and/or structural elements. Machine-readable elements (e.g., bar codes and Quick Response (QR) codes) are printed or electronically-displayed codes that are designed to be read and interpreted by a computing device. Machine-readable elements can include extractable information, such as foodstuff type, foodstuff manufacturer, etc. Human-readable elements (e.g., text and images) may be co-located with the machine-readable elements and identified using various optical character recognition (OCR) techniques. Structural elements (e.g., emblems, horizontal lines, and solid bars) may also be used to identify a branded foodstuff from a branded code.

Figure 2A:
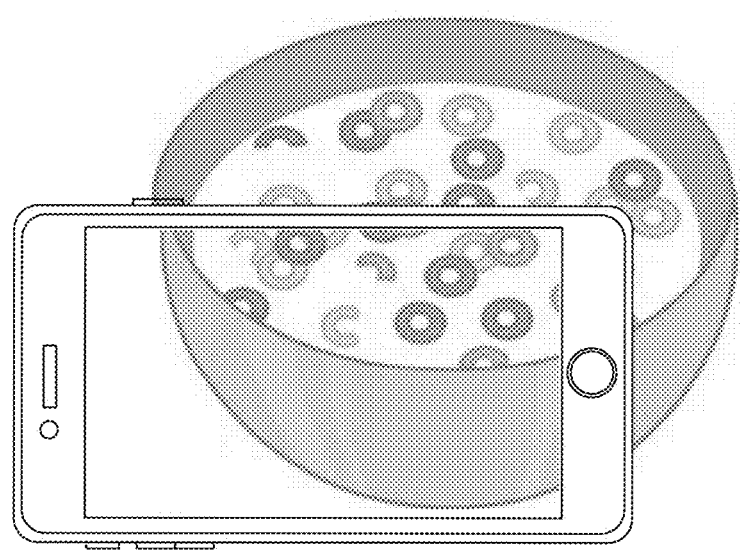
FIG. 2A depicts a live view of an unbranded foodstuff.
Figure 2B:
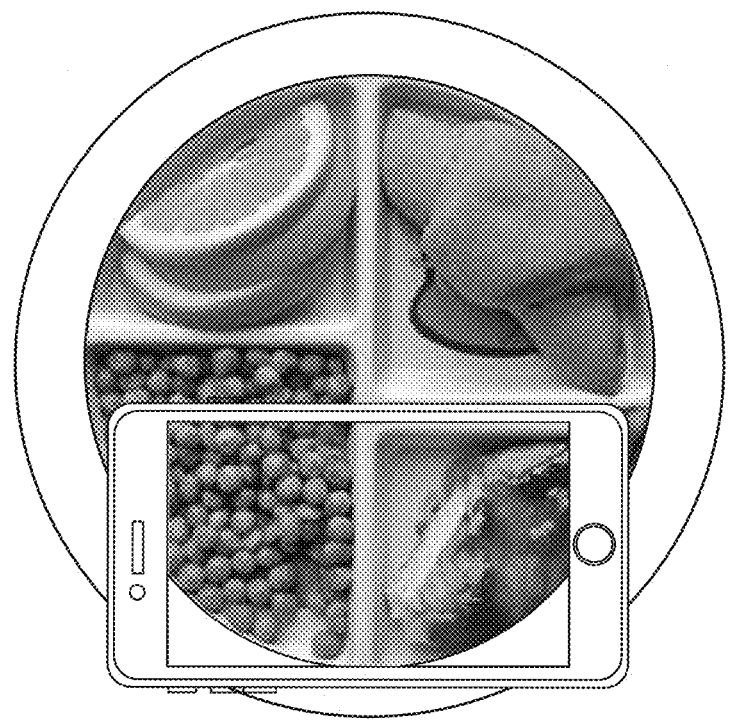
FIG. 2B depicts a live view of multiple unbranded foodstuffs on a plate.

FIG. 2A depicts a live view of an unbranded foodstuff, and FIG. 2B depicts a live view of multiple unbranded foodstuffs on a plate. An "unbranded foodstuff" is a foodstuff that is not associated with a particular brand.

In some embodiments, the application is configured to automatically identify recognizable foodstuff features. For example, the application may apply image processing algorithms to identify certain shapes and/or colors that are indicative of certain foodstuffs (e.g., green spheres for peas, orange cylinders for carrots, white liquid for milk). More specifically, the application may perform image segmentation (e.g., thresholding methods such as Otsu's method, or color-based segmentation such as K-means clustering) on individual frames of the live video feed to isolate regions and objects of interest.

In other embodiments, the application identifies foodstuff(s) upon receiving user input from a parent who indicates which foodstuff(s) should be associated with an augmented reality feature. For example, if the parent wanted to associate the peas of FIG. 2B with an augmented reality feature, then the parent may be able to simply select the mound of peas presented on the screen of the mobile phone (e.g., by tapping the display of the mobile phone). Thus, the parent could select a foodstuff that a child is least likely to consume from one or more foodstuffs on a plate.

The application need not necessarily know the type of the selected foodstuff. That is, the application need not necessarily know whether the selected foodstuff is peas, carrots, spinach, etc. Instead, the application may only care about the geometrical characteristics of the selected foodstuff. Knowledge of the geometrical characteristics allows the application to realistically embed augmented reality feature(s) within the selected foodstuff.

Figure 3:
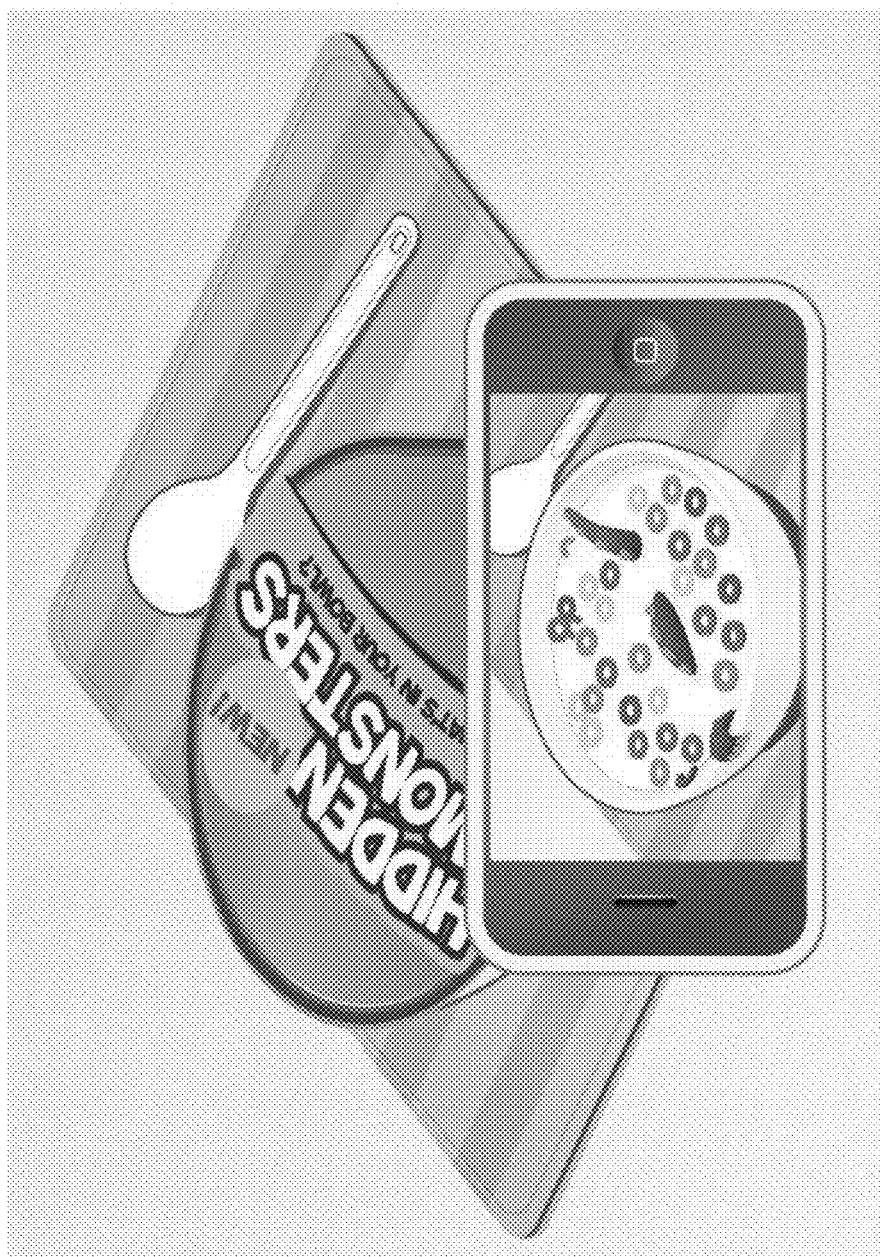
FIG. 3 illustrates how a portion of an augmented reality feature may be visible when a child views a foodstuff through a mobile phone.

FIG. 3 illustrates how a portion of an augmented reality feature may be visible when a child views a foodstuff through a mobile phone. The portion of the augmented reality feature that is shown can also be referred to as a "hint" or "teaser" of the reward that awaits the child once she finishes consuming some or all of the foodstuff. While the foodstuff shown here is associated with a single augmented reality feature, a foodstuff could also be associated with multiple augmented reality features. For example, multiple digitally-animated coins/jewels may be distributed throughout a bowl of cereal or a mound of peas.

The visible portion(s) of the augmented reality feature indicate that something is hidden within or beneath the foodstuff. Here, for example, portions of a digitally-animated dragon are visible when the foodstuff is viewed through the mobile phone. As noted above, augmented reality features can take many different forms, including creatures (e.g., humanoid characters and non-humanoid characters, such as dragons and dinosaurs) and items (e.g., treasure chests, trading cards, jewels, coins).

Animations may also be used to indicate the realism of the augmented reality features. In some embodiments, different appendages (e.g., arms, legs, tails, head) may emerge from a foodstuff over time. For example, the digitally-animated dragon of FIG. 3 may swim through the bowl of cereal over time. Additionally or alternatively, the foodstuff itself may appear as though it is animated. For example, the surface of the bowl of milk may include ripples caused by certain swimming actions or bubbles caused by breathing.

Figure 4A:
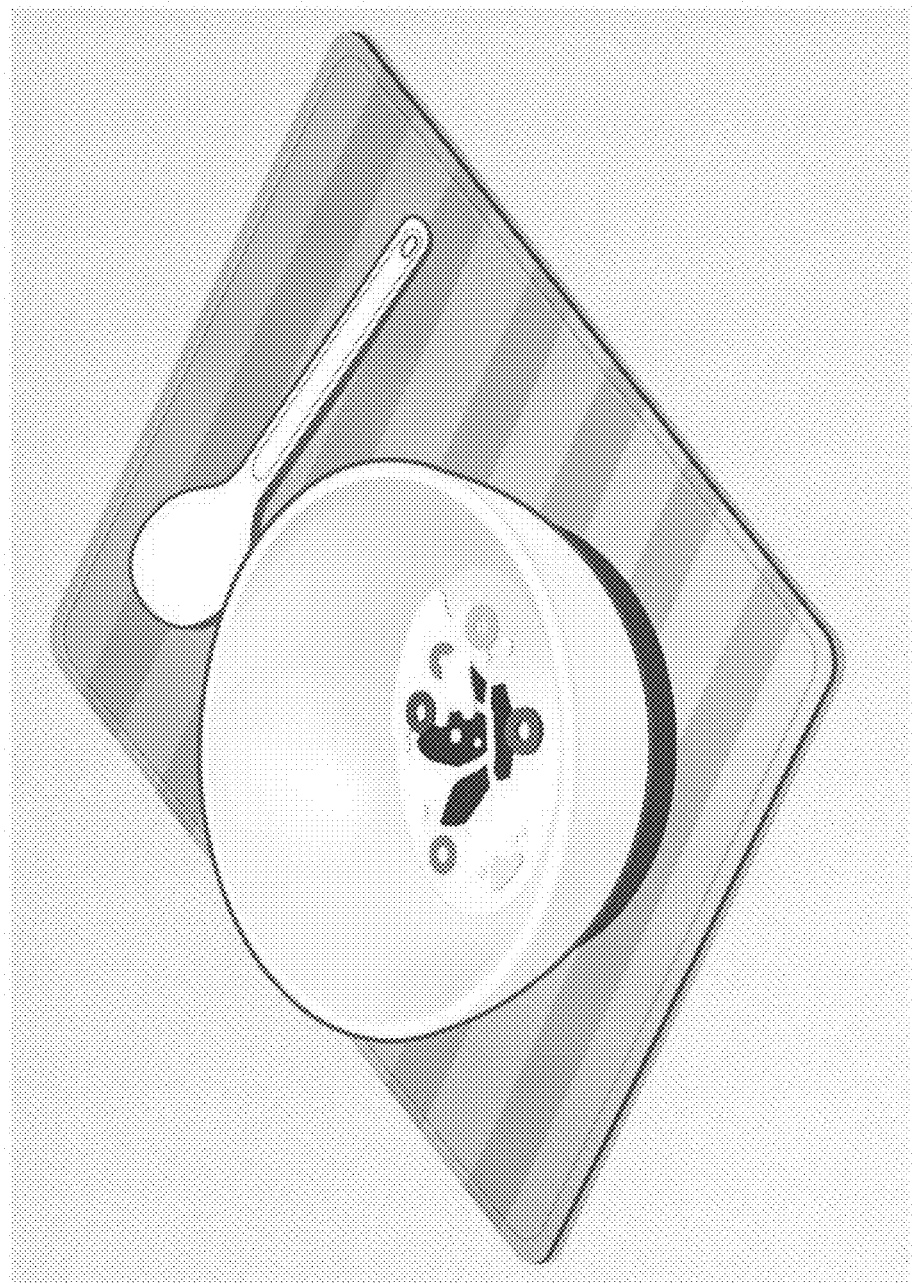
FIG. 4A depicts a bowl after a child has consumed the foodstuff(s) retained within the bowl (here, cereal and milk).

FIG. 4A depicts a bowl after a child has consumed the foodstuff(s) retained within the bowl (here, cereal and milk). After the child has finished consuming some or all of the foodstuff(s), the parent or the child may once again scan the bowl by initiating a live view that is captured by the optical sensor (e.g., a camera) of a computing device (e.g., a mobile phone). The computing device may be the same computing device used to prompt creation of the augmented reality feature or a different computing device.

An application executing on the computing device may detect that some or all of a given foodstuff is no longer present, which is indicative of consumption by the child. For example, the application may compare feature(s) recognized within individual video frames of a current live feed to feature(s) recognized within individual video frames of a previous live feed.

As the child consumes the foodstuff, augmented reality feature(s) hidden within or beneath the foodstuff become increasingly visible. That is, the application may present a "payoff" upon determining that the foodstuff has been consumed by the child. Such a technique incentivizes the child to continue eating certain foodstuff(s) so that the corresponding augmented reality feature(s) can be fully seen.

Figure 4B:
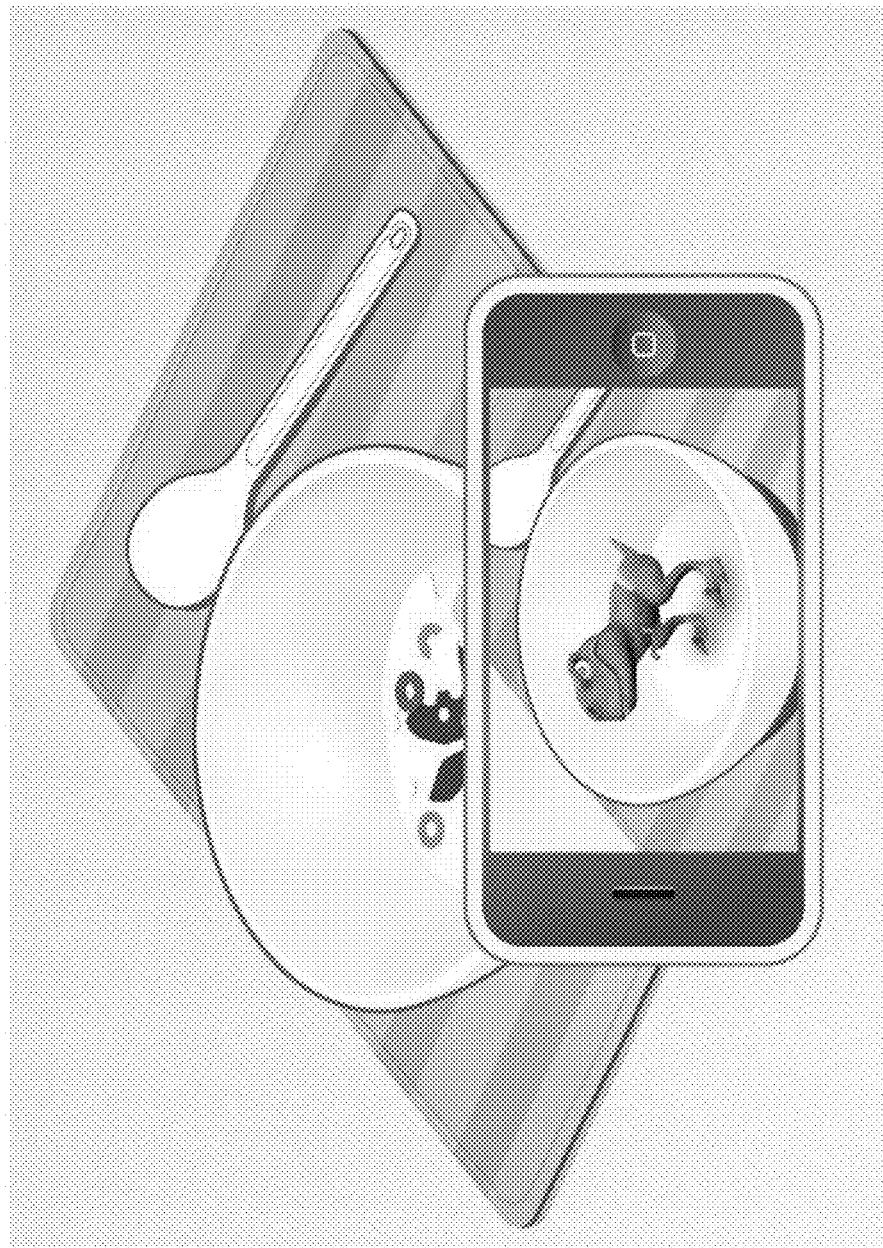
FIG. 4B illustrates how collections of augmented reality features can be collected by the child.
Figure 4C:
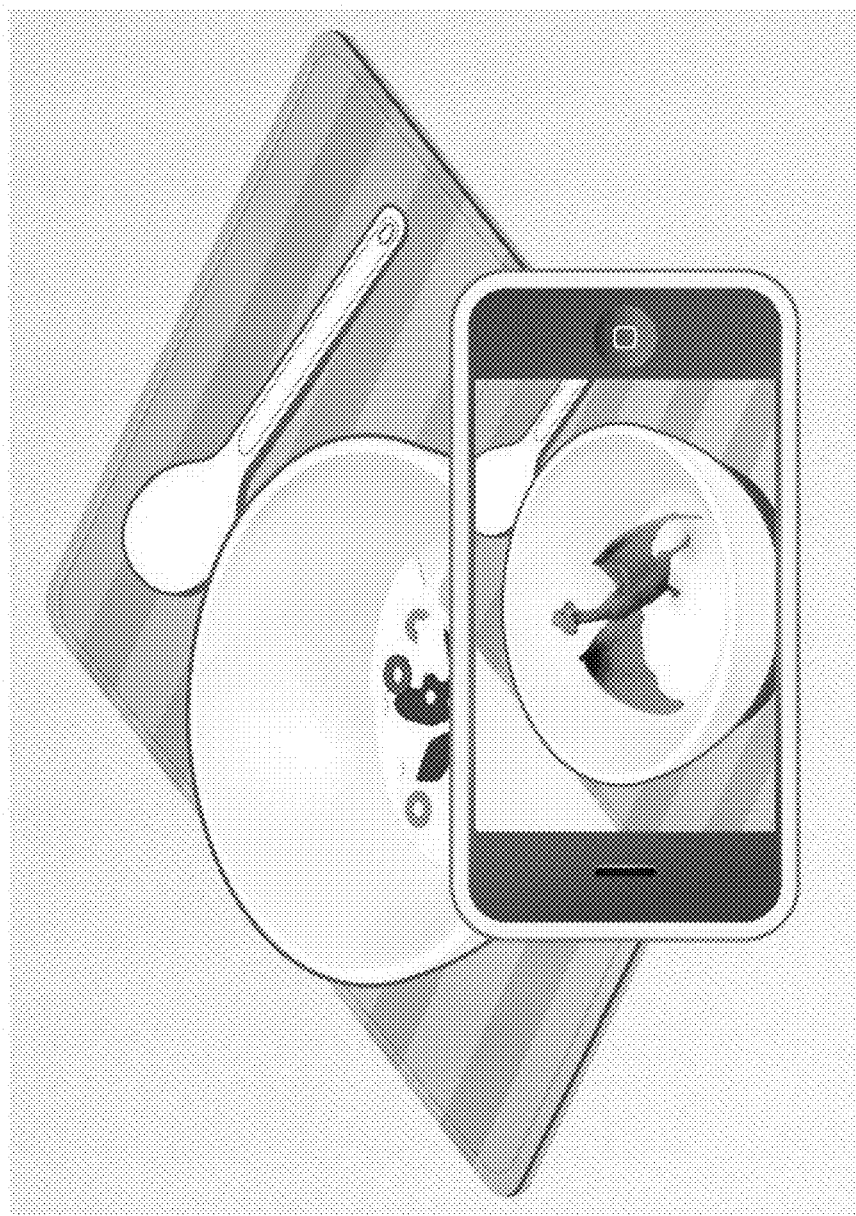
FIG. 4C illustrates how collections of augmented reality features can be collected by the child.

In some embodiments, the "payoff" simply includes presenting an entire augmented reality feature for viewing by the child. FIGS. 4B-C, for example, depict examples of augmented reality features that could be shown upon determining the child has consumed substantially all of the corresponding foodstuff(s). In other embodiments, the "payoff" is a digital collectible corresponding to the augmented reality feature.

Figure 5:
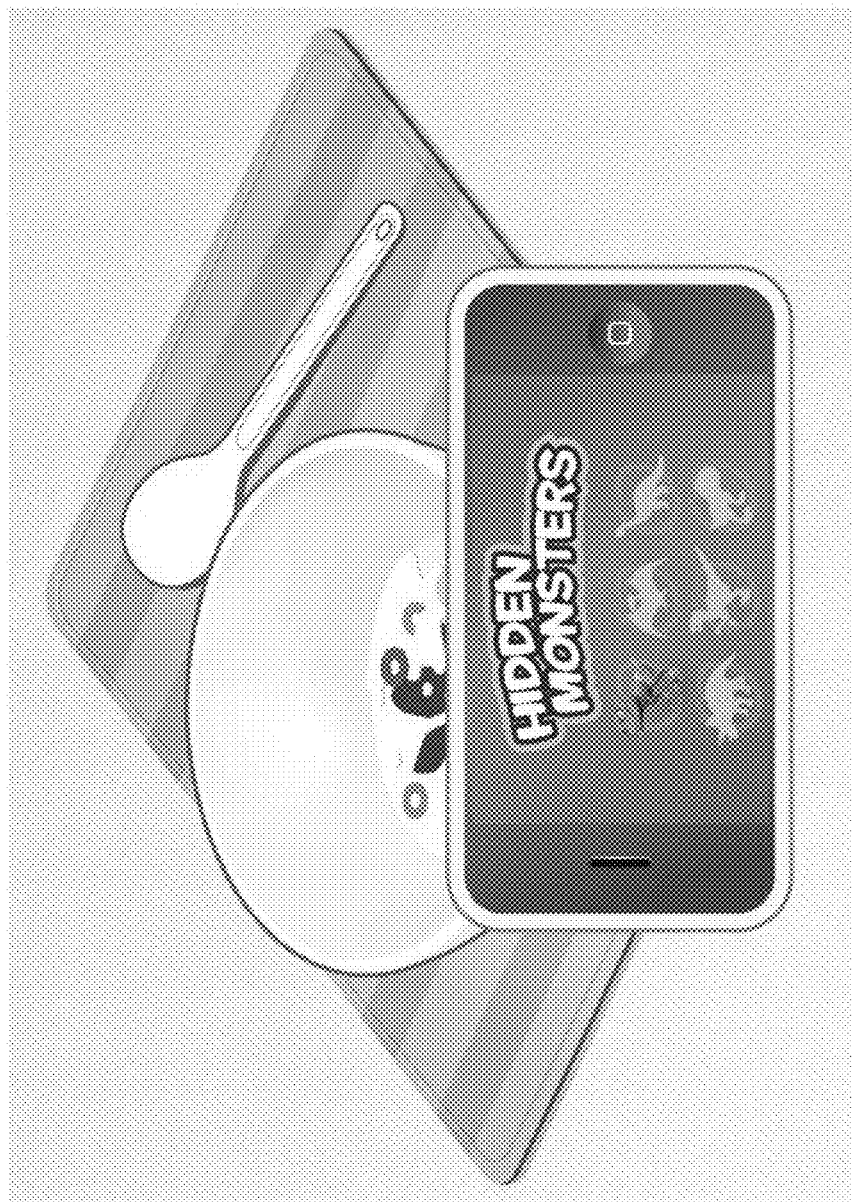
FIG. 5 illustrates how augmented reality features (also referred to as "digital collectibles") acquired by a child may be part of a collection.

FIG. 5 illustrates how augmented reality features (also referred to as "digital collectibles") acquired by a child may be part of a collection. Here, for example, the augmented reality feature of FIG. 4B is one of six augmented reality features that can be collected by the child. The child may collect the various augmented reality features of the collection by consuming different types of foodstuffs, consuming the same type of foodstuffs multiple times, etc.

Collections may be created by an individual (e.g., a parent or some other person, such as a dietician or physician) or an entity responsible for supporting the application. For example, a parent could specify that six different augmented reality features should be associated with six different types of foodstuff that a child typically does not consume. As another example, an entity could specify that six different augmented reality features should be associated with type(s) of foodstuff that are necessary to maintain a healthy diet.

The augmented reality features may also be used to facilitate different forms of social gaming that require social interaction between multiple players (e.g., children). For example, children may be able to care for augmented reality features, trade augmented reality features, battle augmented reality features, etc. Accordingly, the augmented reality features described herein could be used in the context of:
  Card games;
  Social networking games that are integrated into a social network (e.g., Facebook®);
  Board games in which augmented reality features permit usage of certain components/pieces; and
  Video games in which augmented reality features permit usage of certain characters or items.

Such conduct may be permitted regardless of the type of augmented reality feature generated by the application. For example, children could battle augmented reality features that take the form of digitally-animated creatures or trading cards.

Figure 6:
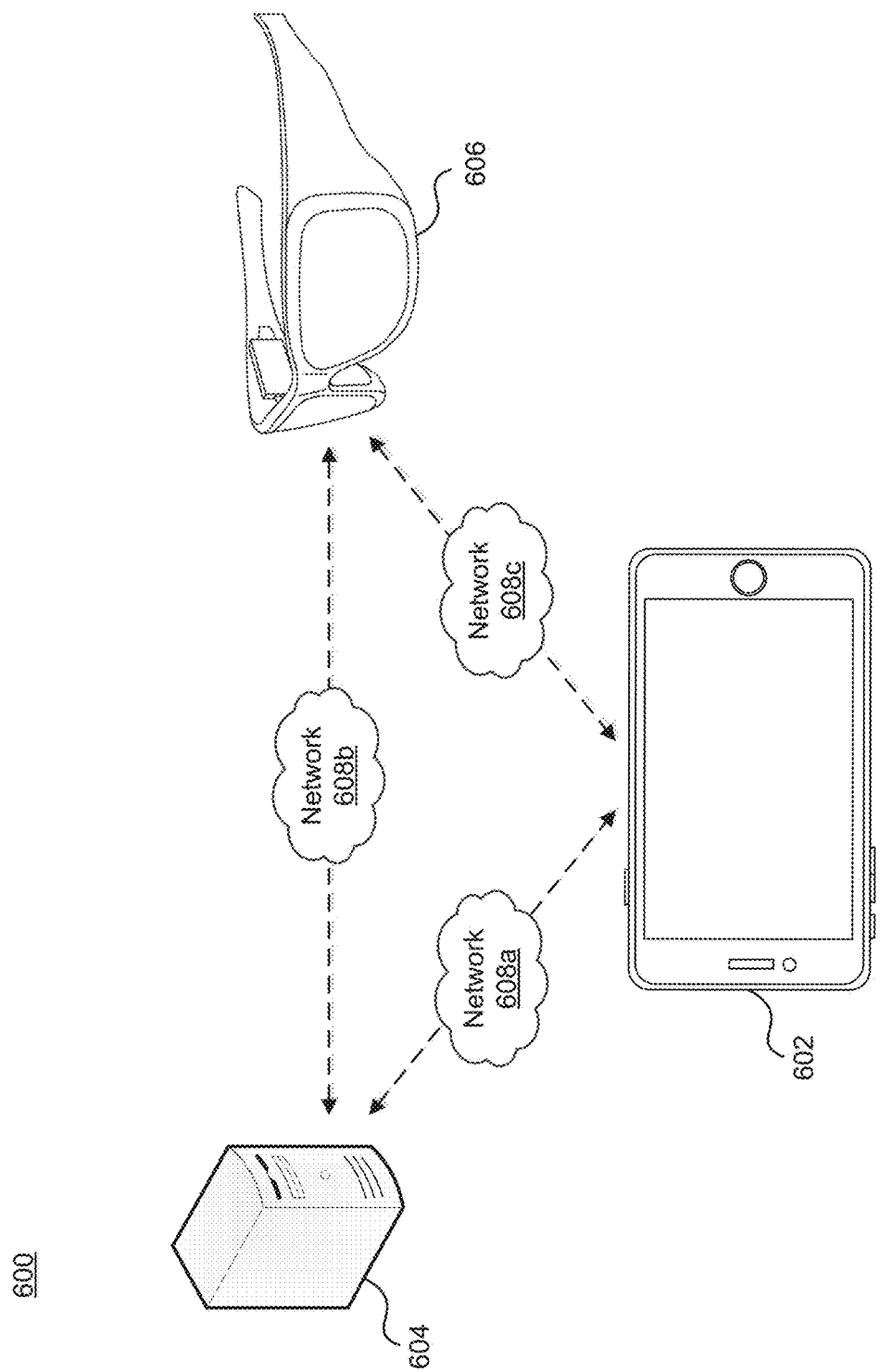
FIG. 6 depicts an example of a network environment that includes a mobile phone having an application configured to present augmented reality features that are embedded within or disposed beneath foodstuff(s) and a network-accessible server system responsible for supporting the application.

FIG. 6 depicts an example of a network environment 600 that includes a mobile phone 602 having an application configured to present augmented reality features that are embedded within or disposed beneath foodstuff(s) and a network-accessible server system 604 responsible for supporting the application. Generally, the network environment 600 will only include the mobile phone 602 and the network-accessible server system 604. However, in some embodiments the network environment 600 also includes another computing device 606 (here, a head-mounted device) in addition to, or instead of, the mobile phone 602.

While many of the embodiments described herein involve mobile phones, those skilled in the art will recognize that such embodiments have been selected for the purpose of illustration only. The technology could be used in combination with any computing device that is able to present augmented reality content, including personal computers, tablet computers, personal digital assistants (PDAs), game consoles (e.g., Sony PlayStation® or Microsoft Xbox®), music players (e.g., Apple iPod Touch®), wearable electronic devices (e.g., watches or fitness bands), network-connected ("smart") devices (e.g., televisions and home assistant devices), virtual/augmented reality systems (e.g., head-mounted displays such as Oculus Rift® and Microsoft Hololens®), or other electronic devices.

For example, a child could wear a head-mounted display that allows the child to have a live direct/indirect view of a physical, real-world environment whose elements are augmented by computer-generated sensory input (e.g., one or more augmented reality features). The augmented reality feature(s) may be created responsive to instructions generated by the head-mounted display or another computing device to which the head-mounted display is communicatively coupled. For example, an application residing on a mobile phone 602 associated with a parent may generate instructions for creating the augmented reality feature(s) and transmit those instructions to the head-mounted display. As another example, a network-connected server system 604 may generate instructions for creating the augmented reality feature(s) and transmit those instructions to the mobile phone 602 or the head-mounted display.

Accordingly, the mobile phone 602, the network-connected server system 604, and/or the other computing device 606 can be connected via one or more computer networks 608a-c, which may include the Internet, local area networks (LANs), wide-area networks (WANs), metropolitan area networks (MANs), cellular networks (e.g., LTE, 3G, 4G), etc. Additionally or alternatively, the mobile phone 602, the network-connected server system 604, and/or the other computing device 606 may communicate with one another over a short-range communication protocol, such as Bluetooth®, Near Field Communication (NFC), radio-frequency identification (RFID), etc.

Generally, an application executing on the mobile phone 602 is responsible for generating and presenting augmented reality features to an individual (e.g., a parent or a child). The network-connected server system 604 and/or the other computing device 606 can be coupled to the mobile phone 602 via a wired channel or a wireless channel. In some embodiments the network-accessible server system 604 is responsible for delivering augmented reality assets (e.g., markers, textures, animation instructions, audio files) to the mobile phone 602, while in other embodiments the mobile phone 602 stores some or all of the augmented reality assets locally (e.g., within a memory). Therefore, in some instances the mobile phone 602 may execute the techniques described herein without needing to be communicatively coupled to any network(s), other computing devices, etc.

Figure 7:
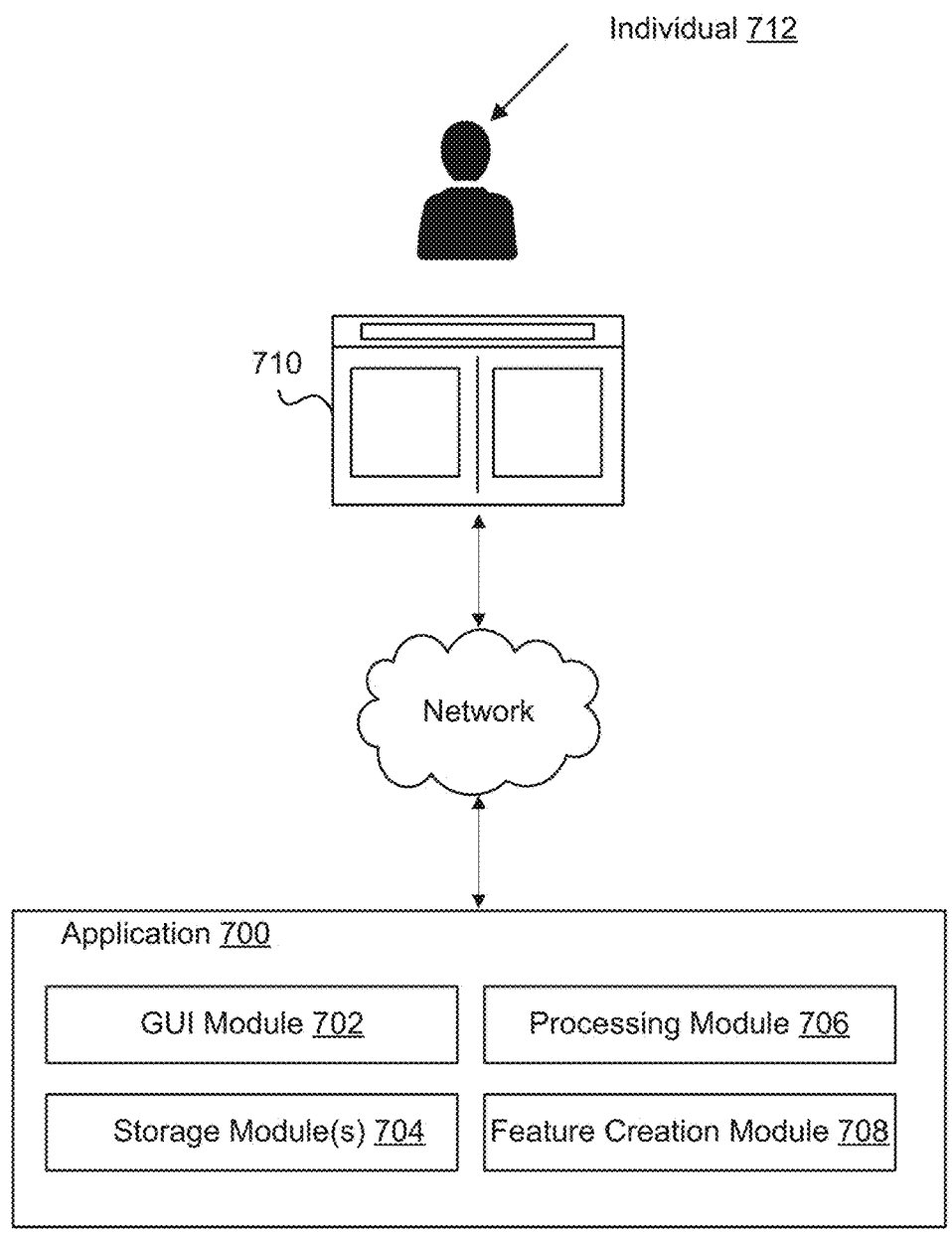
FIG. 7 depicts an application that allows augmented reality features to be created for presentation by a computing device.

FIG. 7 depicts an application 700 that allows augmented reality features to be created for presentation by a computing device. In some embodiments the application 700 is running on the computing device (e.g., a mobile phone), while in other embodiments the application 700 is running on another computing device (e.g., a network-connected server system) that is communicatively coupled to the computing device.

The application 700 can include a graphical user interface (GUI) module 702 that generates an interface 710 through which an individual 712 (e.g., a parent, dietician, or physician) can provide instructions for creating augmented reality feature(s). The interface 710 may be accessible via a web browser, desktop software program, mobile software application, or over-the-top (OTT) application.

More specifically, the application 700 can determine whether to create augmented reality features based on instructions provided by the individual 712 through the interface 710. For example, the individual 712 may scan one or more foodstuffs by initiating a live view that is captured by a camera of the computing device, and then provide instructions at the interface 710 for generating the augmented reality feature(s). The instructions may specify a particular foodstuff, an augmented reality feature type, an augmented reality feature color, an augmented reality feature animation, etc. The instructions can be stored in one or more storage modules 704 that are accessible to the application 700. Thus, feature creation may be completed via the interface 710 that is created and supported by the application 700.

In some embodiments, a processing module 706 of the application 700 is configured to automatically identify recognizable foodstuff features on behalf of the individual 712. The processing module 706 may apply image processing algorithms to identify certain shapes and/or colors that are indicative of certain foodstuffs (e.g., green spheres for peas, orange cylinders for carrots, white liquid for milk). More specifically, the processing module 706 may perform image segmentation on individual frames of the live video feed captured by the camera of the computing device to isolate regions and objects of interest.

In other embodiments, the application 700 identifies foodstuff(s) based on user input received from the individual 712 who indicates which foodstuff(s) should be associated with an augmented reality feature. For example, the individual 712 may be able to simply select a certain foodstuff shown on the interface 710.

A feature creation module 708 can then create an augmented reality feature that is at least partially hidden beneath a foodstuff. For example, portions of a digitally-animated creature may be visible when the foodstuff is viewed through a computing device, as shown in FIG. 3. The augmented reality features can take many different forms, including creatures (e.g., humanoid characters and non-humanoid characters, such as dragons and dinosaurs) and items (e.g., treasure chests, trading cards, jewels, coins).

The feature creation module 708 may also generate instructions that cause the augmented reality feature to perform animation(s). For example, different appendages (e.g., arms, legs, tails, head) may emerge from a foodstuff over time. As another example, the foodstuff itself may appear as though it is animated (e.g., the surface of a foodstuff may include ripples or bubbles).

FIG. 8 depicts a flow diagram of a process 800 for incentivizing the consumption of foodstuff through the use of augmented reality features. Initially, an application is launched on a mobile phone that includes a camera (step 801). Although the embodiment described herein pertains to a mobile phone having a camera, those skilled in the art will recognize that similar steps can be performed using other types of computing devices and optical sensors.

The application can then cause a communication link to be established between the mobile phone and a network-connected server (step 802). The network-connected server (or some other computing device) may be part of a network-connected server system that supports various back-end functionalities of the application.

An individual can then initiate a live view of one or more foodstuffs that is captured by the camera (step 803). The application identifies some or all of the foodstuff(s) included in the live view (step 804). For example, in some embodiments the application may perform image processing in order to automatically identify shapes, colors, or some combination thereof that are indicative of certain foodstuffs, while in other embodiments the application may receive user input indicative of a selection of a foodstuff.

The application can then generate an augmented reality feature that is at least partially hidden beneath a particular foodstuff (step 805). For example, portions of a digitally-animated creature may be visible when the foodstuff is viewed through a mobile phone. The application may also animate a portion of the augmented reality feature that is exposed from the particular foodstuff (step 806). For example, a tail protruding from a foodstuff may slowly move back and forth. Additionally or alternatively, the application may animate the particular foodstuff. For example, the application may cause ripples to appear in the foodstuff proximate to the tail and/or bubbles to appear in the foodstuff proximate to the creature's head.

After creating the augmented reality feature, the application can monitor the live view that is captured by the camera (step 807). Such action may occur during a single viewing session or across multiple viewing sessions. For example, a first individual (e.g., a parent) may initiate a first viewing session during which the augmented reality feature is created, and then a second individual (e.g., a child) may initiate a second viewing session during which the augmented reality feature can be observed. The second viewing session typically occurs during or after consumption of the particular foodstuff.

In some instances, the application will determine that the particular foodstuff has been partially or entirely consumed (step 808). Generally, the application arrives at such a determination by performing image processing on individual frames of the live view. Note, however, the process 800 could also be carried out on static images captured by the camera rather than a live view. For example, the application may compare feature(s) recognized within individual video frames of a current live feed to feature(s) recognized within individual video frames of a previous live feed.

The application then displays one or more additional portions of the augmented reality feature based on the amount of the particular foodstuff that has been consumed (step 809). Said another way, the application can expose additional portion(s) of the augmented reality feature as an individual (e.g., a child) consumes the particular foodstuff.

In some embodiments, the application is configured to generate metadata specifying that the additional portion(s) of the augmented reality feature have been exposed due to consumption of the particular foodstuff (step 810). Moreover, the metadata may be transmitted to the network-connected server responsible for supporting the application (step 811). Reception of the metadata may prompt the network-connected server to create a database record that specifies the augmented reality feature should be made accessible to an individual (e.g., a child) through the application or another application. Accordingly, the augmented reality feature may be one of several different augmented reality features that can be collected by a child by consuming different types of foodstuffs, consuming the same type of foodstuffs multiple times, etc.

FIG. 9 depicts a flow diagram of a process 900 for creating augmented reality features that can be used to incentivize the consumption of foodstuffs. Steps 901-903 are largely identical to steps 801-803 of FIG. 8.

In order to facilitate the creation of augmented reality features, the application may be configured to automatically identify some or all of the foodstuff(s) visible through the live feed (step 904). For example, the application may apply image processing algorithms to identify certain shapes and/or colors that are indicative of certain foodstuffs (e.g., green spheres for peas, orange cylinders for carrots, white liquid for milk). More specifically, the application may perform image segmentation (e.g., thresholding methods such as Otsu's method, or color-based segmentation such as K-means clustering) on individual frames of the live video feed to isolate regions and objects of interest.

While the application may be configured to automatically identify recognizable features, an individual (e.g., a parent) will typically need to indicate which foodstuff(s) on a plate should be associated with an augmented reality feature. Accordingly, the application may receive user input indicative of a selection of a particular foodstuff (step 905). Generally, user input is created when the individual taps the screen of a mobile phone in the location where the particular foodstuff is being shown. However, other input devices may also be used.

The application may also receive user input indicative of a specification of a characteristic of the augmented reality feature to be generated (step 906). For example, the individual may specify a certain feature type (e.g., a particular creature such as a dragon or dinosaur, or a particular item such as a trading card), a certain color, a certain animation, etc. The application can then generate the augmented reality feature in accordance with the user input(s) (step 907).

Unless contrary to physical possibility, it is envisioned that the steps described above may be performed in various sequences and combinations. For example, in some embodiments a parent may select the type of augmented reality feature to be displayed prior to selecting the foodstuff in which the augmented reality feature is at least partially buried.

Additional steps could also be included in some embodiments. In some embodiments. the application may continually monitor the live feed in order to determine which portion(s) of the augmented reality feature should be digitally exposed at any given point in time. Moreover, the portion(s) may change over time as a child consumes/moves the corresponding foodstuff. For example, different portion(s) of the augmented reality feature may be visible if the child shifts a mound of peas around, but the entirety of the augmented reality feature may not be visible until most or all of the peas have been consumed.

In fact, a parent could specify a threshold level of consumption that is necessary before the augmented reality feature can be "acquired" by a child. For example, the parent may specify that the child must consume 50%, 75%, or 95% of the corresponding foodstuff before the augmented reality feature is made available through other channels (e.g., social media networks, digital collections, or video games).

Processing System

Figure 10:
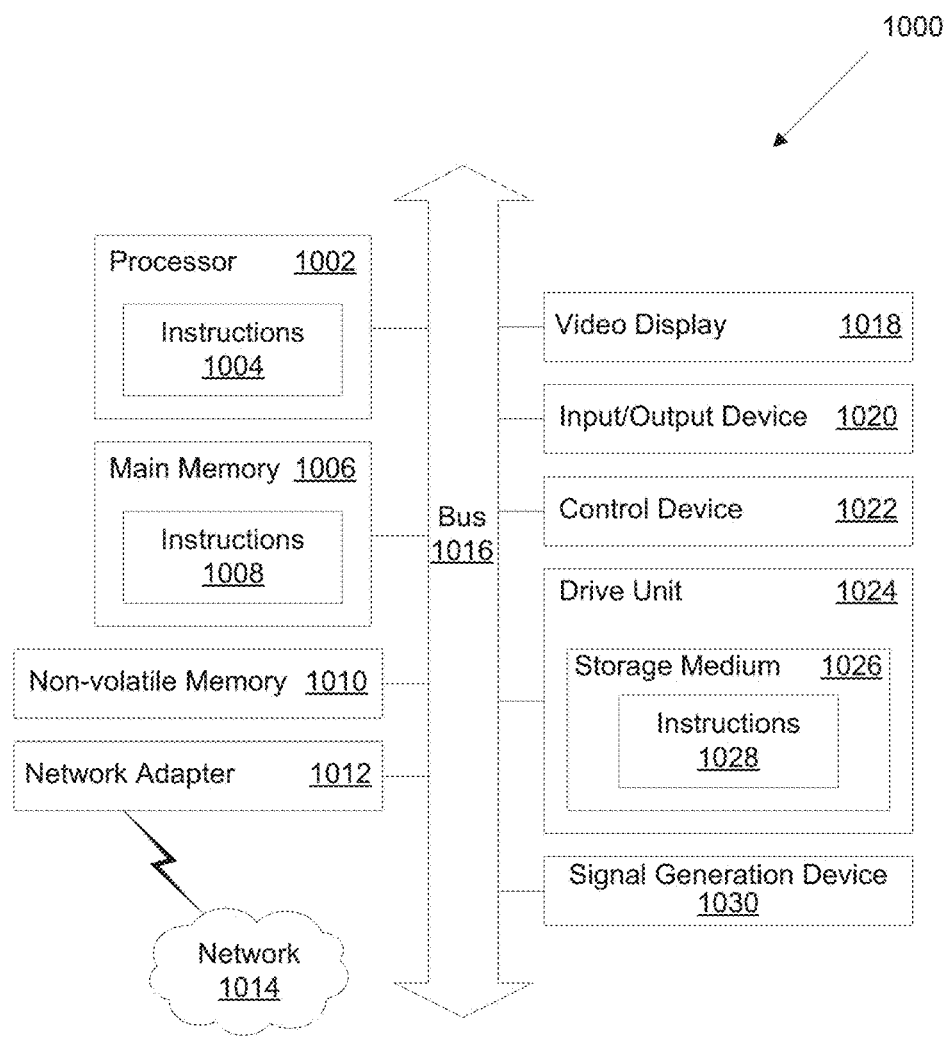
FIG. 10 is a block diagram illustrating an example of a processing system in which at least some operations described herein can be implemented.

FIG. 10 is a block diagram illustrating an example of a processing system 1000 in which at least some operations described herein can be implemented. The processing system may include one or more central processing units ("processors") 1002, main memory 1006, non-volatile memory 1010, network adapter 1012 (e.g., network interfaces), video display 1018, input/output devices 1020, control device 1022 (e.g., keyboard and pointing devices), drive unit 1024 including a storage medium 1026, and signal generation device 1030 that are communicatively connected to a bus 1016.

The bus 1016 is illustrated as an abstraction that represents one or more physical buses and/or point-to-point connections that are connected by appropriate bridges, adapters, or controllers. Therefore, the bus 1016 can include a system bus, a Peripheral Component Interconnect (PCI) bus or PCI-Express bus, a HyperTransport or industry standard architecture (ISA) bus, a small computer system interface (SCSI) bus, a universal serial bus (USB), IC (I2C) bus, or an Institute of Electrical and Electronics Engineers (IEEE) standard 1394 bus (also referred to as "Firewire").

In some embodiments the processing system 1000 operates as part of a mobile phone that executes an application configured to generate augmented reality features, while in other embodiments the processing system 1000 is connected (wired or wirelessly) to the mobile phone. In a networked deployment, the processing system 1000 may operate in the capacity of a server or a client machine in a client-server network environment, or as a peer machine in a peer-to-peer network environment. The processing system 1000 may be a server, a personal computer (PC), a tablet computer, a laptop computer, a personal digital assistant (PDA), a mobile phone, a processor, a telephone, a web appliance, a network router, a switch, a bridge, a console, a gaming device, a music player, or any machine capable of executing a set of instructions (sequential or otherwise) that specify actions to be taken by the processing system 1000.

While the main memory 1006, non-volatile memory 1010, and storage medium 1026 (also called a "machine-readable medium") are shown to be a single medium, the term "machine-readable medium" and "storage medium" should be taken to include a single medium or multiple media (e.g., a centralized or distributed database and/or associated caches and servers) that store one or more sets of instructions 1028. The term "machine-readable medium" and "storage medium" shall also be taken to include any medium that is capable of storing, encoding, or carrying a set of instructions for execution by the processing system 1000.

In general, the routines executed to implement the embodiments of the disclosure may be implemented as part of an operating system or a specific application, component, program, object, module or sequence of instructions referred to as "computer programs." The computer programs typically comprise one or more instructions (e.g., instructions 1004, 1008, 1028) set at various times in various memory and storage devices in a computing device, and that, when read and executed by the one or more processors 1002, cause the processing system 1000 to perform operations to execute elements involving the various aspects of the technology.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include, but are not limited to, recordable-type media such as volatile and non-volatile memory devices 1010, floppy and other removable disks, hard disk drives, optical disks (e.g., Compact Disk Read-Only Memory (CD ROMS), Digital Versatile Disks (DVDs)), and transmission-type media such as digital and analog communication links.

The network adapter 1012 enables the processing system 1000 to mediate data in a network 1014 with an entity that is external to the processing system 1000 through any communication protocol supported by the processing system 1000 and the external entity. The network adapter 1012 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1012 can include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the technology may vary considerably in its implementation details while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments covered by the claims.

The language used in the specification has been principally selected for readability and instructional purposes, and it may not have been selected to delineate or circumscribe the inventive subject matter. It is therefore intended that the scope of the invention not be limited by this Detailed Description, but rather by any claims that issue on an application based hereon. Accordingly, the disclosure of various embodiments is intended to be illustrative, but not limiting, of the scope of the technology.

What is claimed is:

1. A non-transitory computer-readable medium with instructions stored thereon that, when executed by a processor, cause the processor to perform operations comprising:
   causing an optical sensor of a computing device to capture a first image of a physical object indicative of a foodstuff;
   establishing a characteristic of the physical object by examining the first image; and
   generating an augmented reality feature that is at least partially hidden beneath the foodstuff when viewed using the computing device.

2. The non-transitory computer-readable medium of claim 1, wherein the first image is one of a series of images that is representative of a video.

3. The non-transitory computer-readable medium of claim 1, wherein the first image is one of a series of images captured by the optical sensor during a live view of the physical object.

4. The non-transitory computer-readable medium of claim 1, wherein the physical object is a package in which the foodstuff resides, a piece of tableware, or the foodstuff.

5. The non-transitory computer-readable medium of claim 1, wherein the characteristic is a surface contour, a shape, a color, or any combination thereof.

6. The non-transitory computer-readable medium of claim 1, wherein the operations further comprise:
   animating a portion of the augmented reality feature that is exposed from the foodstuff.

7. The non-transitory computer-readable medium of claim 1, wherein the operations further comprise:
   animating a surface of the foodstuff to indicate that the augmented reality feature is entirely hidden within the foodstuff.

8. The non-transitory computer-readable medium of claim 1, wherein the operations further comprise:
   causing the optical sensor of the computing device to capture a second image of the physical object indicative of the foodstuff;
   determining, based on a comparison of the first and second images, that the foodstuff has been at least partially consumed; and
   displaying a portion of the augmented reality feature that was previously hidden beneath the foodstuff,
     wherein the portion is based on an amount of the foodstuff that has been consumed.

9. The non-transitory computer-readable medium of claim 8, wherein the operations further comprise:
   generating metadata specifying that the portion of the augmented reality feature has been exposed; and
   transmitting the metadata to a network-connected server system configured to maintain a list of consumed foodstuffs, exposed augmented reality features, or any combination thereof.

10. The non-transitory computer-readable medium of claim 9, wherein reception of the metadata prompts the network-connected server system to create a record that specifies the augmented reality feature should be made accessible through a software program executing on the computing device.

11. A network-connected computer server comprising:
a memory that includes instructions for supporting a software program designed to incentivize the consumption of foodstuffs,
wherein the instructions, when executed by a processor, cause the processor to:
identify an instance of the software program that is executing on a computing device;
receive, from the instance of the software program, metadata that specifies a portion of an augmented reality feature that was previously hidden beneath a foodstuff has been exposed due to consumption of the foodstuff;
create a record that specifies the augmented reality feature should be made accessible through the instance of the software program; and
enable an individual to interact with the augmented reality feature through the instance of the software program.

12. The network-connected computer server of claim 11, wherein the augmented reality feature is a digital creature or a digital item.

13. The network-connected computer server of claim 11,
wherein the computing device is one of multiple computing devices that are communicatively coupled to the network-connected computer server, and
wherein each computing device of the multiple computing devices executes a separate instance of the software program.

14. A computer-implemented method comprising:
initiating a software program on a computing device that includes an optical sensor;
causing the optical sensor to capture a first image of a foodstuff; and
generating an augmented reality feature that is at least partially hidden beneath the foodstuff when viewed using the computing device.

15. The computer-implemented method of claim 14, further comprising:
identifying the foodstuff by applying an image processing algorithm designed to identify a shape or a color indicative of a given foodstuff to the first image.

16. The computer-implemented method of claim 14, further comprising:
identifying the foodstuff by recognizing a branded code that conveys information about a given foodstuff.

17. The computer-implemented method of claim 16, wherein the branded code is printed on a package in which the foodstuff resides, a loose item secured within the package, or a receipt for a purchase of the foodstuff.

18. The computer-implemented method of claim 16, wherein the branded code includes a machine-readable element, a human-readable element, a structural element, or any combination thereof.

19. The computer-implemented method of claim 16, wherein the branded code includes a bar code or a Quick Response (QR) code that is scannable by the software program.

20. The computer-implemented method of claim 14, further comprising:
causing the optical sensor to capture a second image of the foodstuff;
determining, based on a comparison of the first and second images, that the foodstuff has been at least partially consumed; and
displaying a portion of the augmented reality feature that was previously hidden beneath the foodstuff,
wherein the portion is based on an amount of the foodstuff that has been consumed.

* * * * *